United States Patent
Mitamura

(10) Patent No.: US 6,196,819 B1
(45) Date of Patent: Mar. 6, 2001

(54) TIRE VULCANIZING EQUIPMENT

(75) Inventor: Hisashi Mitamura, Takasago (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 0 days.

(21) Appl. No.: 09/255,034

(22) Filed: Feb. 22, 1999

(30) Foreign Application Priority Data

Mar. 2, 1998 (JP) .................................................. 10-049219

(51) Int. Cl.$^7$ .................................................. B29C 35/02
(52) U.S. Cl. .................................................. 425/34.1; 425/38
(58) Field of Search .................................. 425/28.1, 34.1, 425/38

(56) References Cited

U.S. PATENT DOCUMENTS

| | | | |
|---|---|---|---|
| 1,900,456 | * 3/1933 | Mead .................................. | 425/34.1 |
| 3,054,141 | * 9/1962 | Hammesfahr ........................ | 425/34.1 |
| 3,477,100 | 11/1969 | Pech et al. . | |
| 5,681,594 | 10/1997 | Irie ...................................... | 425/34.1 |

FOREIGN PATENT DOCUMENTS

| | | |
|---|---|---|
| 8-164527 | 6/1996 | (JP) . |
| 8-281655 | 10/1996 | (JP) . |

* cited by examiner

*Primary Examiner*—James P. Mackey
(74) *Attorney, Agent, or Firm*—Oblon, Spivak, McClelland, Maier & Neustadt, P.C.

(57) ABSTRACT

The present invention provides a tire vulcanizing equipment capable of improving the production cycle by miniaturization of idle time of each device and shortening of carrying time, reducing the cost by simplification of the device and space saving, and smoothing the physical distribution line. This vulcanizing equipment comprises vulcanizing stations C consisting of the arrangement of a plurality of mold bases 2 having pipings for supplying and discharging a vulcanization medium to tire mold assemblies 1 placed thereon; an opening and closing station A having an opening and closing device 6 for opening and closing the moving mold 1, a loader 7, and an unloader 8; and a transfer station D having a transfer device for transferring the tire mold assembly 1. The vulcanizing stations C and the opening and closing station A are arranged circularly around the transfer station D.

5 Claims, 3 Drawing Sheets

TIRE VULCANIZING EQUIPMENT

BACKGROUND OF THE INVENTION

1. Field of the Invention

The present invention relates to a tire vulcanizing equipment.

2. Description of the Related Art

In a conventional tire vulcanizing press, the working time of opening and closing a tire mold assembly to perform carrying-in of a unvulcanized tire, shaping, and unloading of a vulcanized tire is extremely short, compared with the vulcanizing time. Therefore, equipments in which the number of tire vulcanizing devices to one tire mold opening and closing device for opening and closing the tire mold assembly or tire carrying-in and carrying-out device is increased to improve the availability factors of these devices have been variously devised. In a tire vulcanizing equipment shown in FIG. 3 (refer to Japanese Patent Application Laid-Open No. 8-281655 which is hereby fully incorporated by reference), particularly, vulcanizing stations 100L, 100R comprise plural sets of tire mold assemblies ML1~9, MR1~9 circularly arranged, and it is worth notice from the viewpoint of that each tire mold assembly ML1~9, MR1~9 can be carried from tire mold opening and closing stations 400L, 400R provided in the respective centers thereof to the vulcanizing stations 100L, 100R in the same condition (at the same carrying speed) and delivered from the mold opening and closing stations 400L, 400R to the vulcanizing stations 100L, 100R in a relatively short time.

In FIG. 3, the mold opening and closing stations 400L, 400R are rotated until the corresponding tire mold assemblies ML1~9, MR1~9 are opposed to mold carrying trucks 110, the corresponding tire mold assemblies M are taken from the vulcanizing stations 100L, 100R onto the mold carrying trucks 110 and carried to the centers of the opening and closing stations, wherein the tire mold assemblies M are opened and closed to carry out vulcanized tires from the tire mold assemblies, and carry unvulcanized tires into the same assemblies M, and the tire mold assemblies M are thereafter returned again to the vulcanizing stations 100L, 100R. The vulcanizing stations 100L, 100R have a plurality of radially arranged mold bases 101L, 101R, and the internal pressure supplying devices (heating and pressurizing medium supplying devices to tire internal part) 102L, 102R and external pressure supplying devices (heating medium supplying devices to tire mold circumferential part) 103L, 103R provided in the vulcanizing stations 100L, 100R are connected to the tire metal mold assemblies M to advance the vulcanization.

In this tire vulcanizing equipment, storage bases for vulcanized tires and unvulcanized tires, which are not shown in FIG. 3, are arranged on the circular second floor situated above the vulcanizing stations 100L, 100R, and the carrying-out of vulcanized tires and the carrying-in of unvulcanized tires are performed by vertically movable loaders and unloaders provided in the mold opening and closing stations 400L, 400R. A mold opening and closing station 400A provided on the outside of the circles is used for replacement of the tire metal mold assemblies M.

The tire vulcanizing equipment shown in FIG. 3, however, has problems in that the rotation of the mold opening and closing stations including opening and closing devices and carrying devices makes the devices complicated for piping and wiring distributions, a gigantic rotating device is required to rotate a heavy equipment including all of the opening and closing stations, carrying trucks, tire mold assemblies, truck rails and the like, which leads to a cost increase, and the rotation of the tall heavy equipment limits the rotating speed in order to avoid the danger of falling, vibration or the like, so that the carrying time can not be efficiently shortened.

Further, the tire vulcanizing equipment shown in FIG. 3 has another problem in that the tire mold assembly has no means of escape from the vulcanizing station to stop all the movements when one mold opening and closing station set in the center breaks down. In such a case, many tires left in the vulcanizing station can not be taken out from the molds even if the vulcanizing time expires, resulting in defective products by over-curing.

According to the tire vulcanizing equipment shown in FIG. 3, further, the same circular arrangement of supply of unvulcanized tires and carrying of vulcanized tires as the vulcanizing stations leads to the enlargement/complication of devices including a control device for tire.

Even if they are fixed to one position, the extra rotating operation of the opening and closing station is required since pickup of unvulcanized tires and carrying-out of vulcanized tires are performed in this position every time, and the problem of not only complication but also extension of the cycle time arises.

SUMMARY OF THE INVENTION

In consideration of the above problems, the present invention thus has an object to provide a tire vulcanizing equipment capable of improving the production cycle by minimization of idle time of each device and shortening of carrying time, reducing the cost by simplification of devices and space saving, and smoothening the physical distribution line.

According to a first invention, there is provided a tire vulcanizing equipment which comprises vulcanizing stations consisting of the arrangement of a plurality of mold bases capable of placing tire mold assemblies movable in closed state and having pipings for supplying and discharging a vulcanizing medium to the tire mold assemblies; an opening and closing station having an opening and closing device for opening and closing the tire mold assembly, and connected to the carrying-out line of vulcanized tires to the following process and the carrying-in line of unvulcanized tires; and a transfer station having a transfer device for transferring the tire mold assembly to the vulcanizing station and the opening and closing station, the vulcanizing stations and the opening and closing station being arranged circularly around the transfer station.

As the transfer device, combination of a carrying device capable of delivering a carried matter which has been traditionally used such as a one for pushing and pulling a mold assembly on a free roller by a different actuator or the like with a rotating device can be adapted.

The transfer station is situated in a position having an equal distance from any mold base (the center of the circle), so that the carrying time of each tire mold assembly can be equalized, the vulcanizing condition can be made constant, and stable products can be thus provided. Since the transfer station has a simple structure consisting of a carrying device and a turn table, the device can be made compact.

Since the opening and closing device of the opening and closing station is stationary, the piping and wiring can be fixed, and the whole device can be also simplified. Further, since the carrying-out of vulcanized tires and the carrying-in of unvulcanized tires can be collected to one place (the opening and closing station), the physical distribution device can be simplified and smoothed.

Since the transfer station has a simple structure for performing only the transfer, and the center of gravity can be set low, the turning speed can be increased to shorten the carrying time.

According to a second invention, in addition to the first invention, an auxiliary station is provided on the circle, and a vulcanizing equipment having an opening and closing device for opening and closing the tire metal mold assembly is arranged in the auxiliary station.

Even if the opening and closing device of the opening and closing station is stopped by any trouble, pickup of vulcanized tire can be performed in the auxiliary station without stopping the flow of the whole equipment, so that the product can be prevented from being defective or junk by over-curing.

This auxiliary station can be used also as a mold replacing station by connecting a mold replacing line thereto. In that case, the transfer process between the opening and closing station and the vulcanizing station and the vulcanizing process in the vulcanizing station are continued during mold replacement, and the mold replacing work can be thus efficiently performed without interrupting the tire manufacturing process.

According to a third invention, in addition to the first or second invention, two or more circles consisting of the vulcanizing stations and the opening and closing station arranged around the transfer station are juxtaposed.

According to a fourth invention, in addition to the first, second or third invention, the transfer station is formed of a rotary turn table and a mechanism for delivering a tire mold assembly onto the turn table.

Since the transfer device and a control device thereof can be simplified, the cost is reduced, and the reliability is enhanced.

Further, the turning speed can be increased since the center of gravity of the device can be lowered.

PREFERRED EMBODIMENTS OF THE INVENTION

Preferred embodiments of the prevent invention are further described in reference to accompanying drawings.

Figure 1:
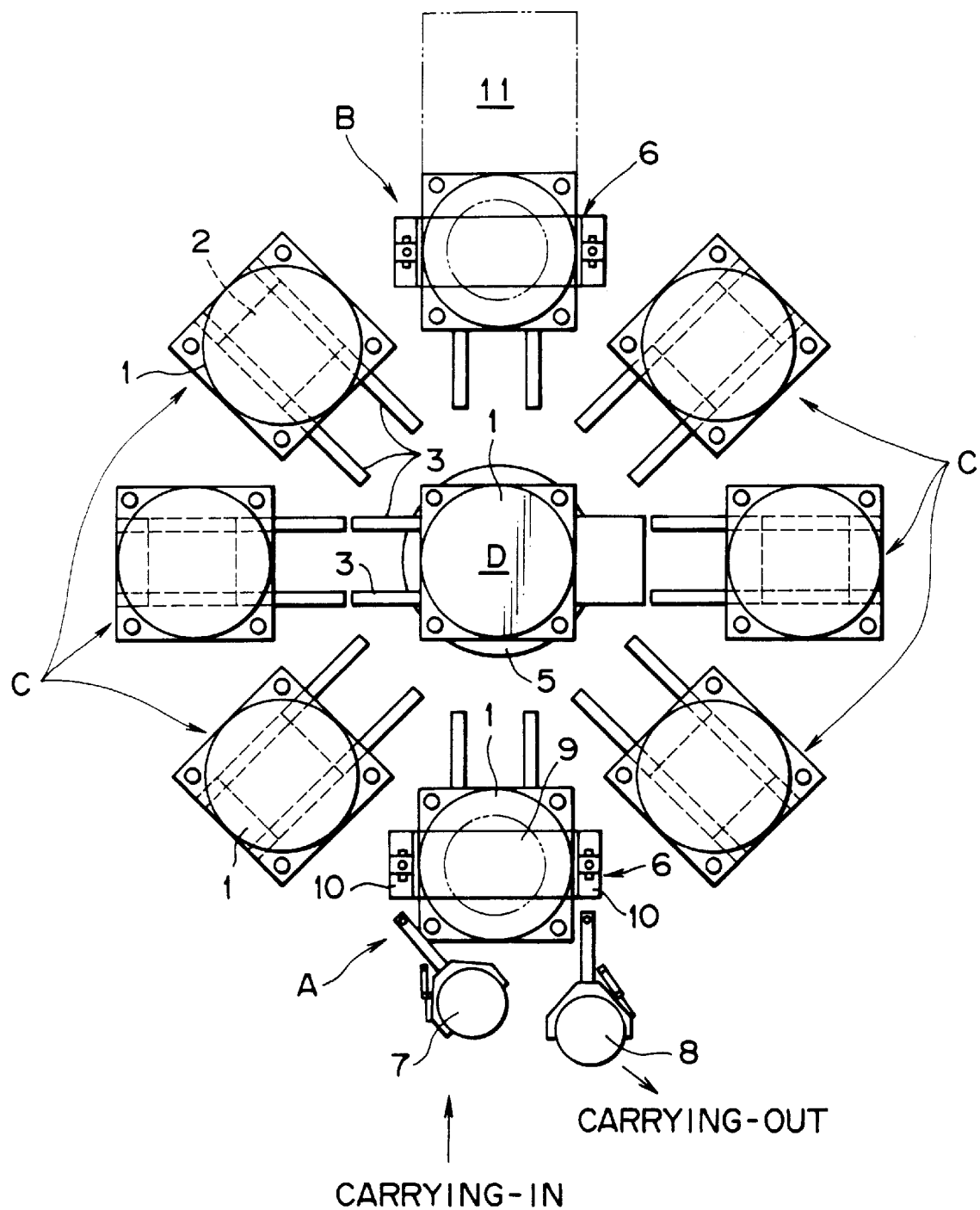
FIG. 1 is a plan arrangement view of a tire vulcanizing equipment according to one embodiment of the present invention.
Figure 2:
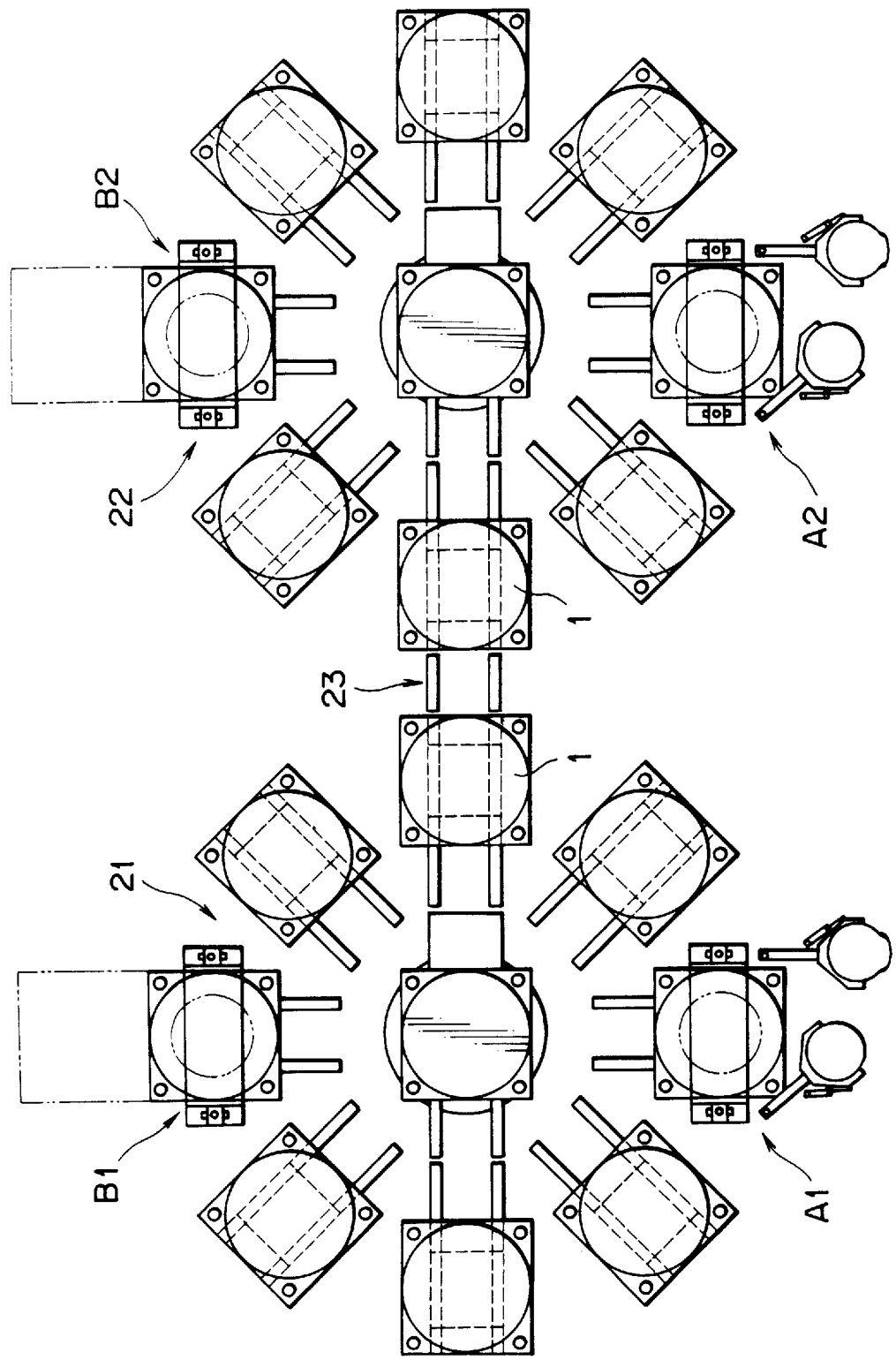
FIG. 2 is a plan arrangement view of a tire vulcanizing equipment according to the other embodiment of the present invention.
Figure 3:
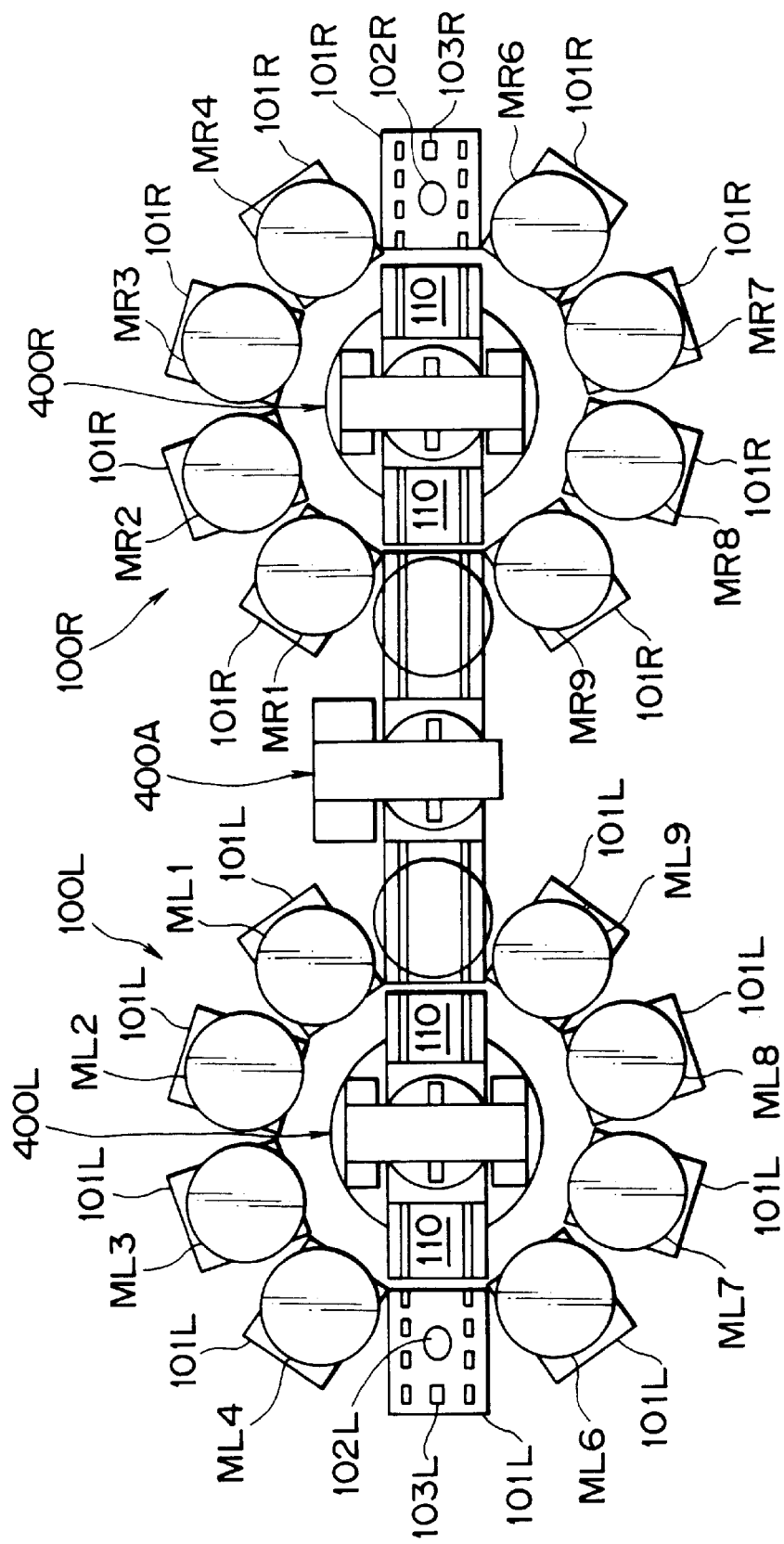
FIG. 3 is a view illustrating a conventional vulcanizing equipment.

FIG. 1 is a plan arrangement view of a tire vulcanizing equipment according to one embodiment of the present invention, and FIG. 2 shows the other embodiment.

In FIG. 1, the tire vulcanizing equipment of the present invention comprises vulcanizing stations C, a transfer station D, an opening and closing station A, and an auxiliary station B. The vulcanizing stations C, the opening and closing station A, and the auxiliary station B are situated on a circle around the transfer station D, and a unvulcanized tire carried into the opening and closing station A is installed into a tire mold assembly 1 in the opening and closing station A. The tire mold assembly 1 clamped in the opening and closing station A is transferred to an empty vulcanizing station C through the transfer station D. When the vulcanization draws to a close after the lapse of a fixed time in the vulcanizing station C, the tire mold assembly 1 is returned to the opening and closing station A through the transfer station D. Since it comes time to end the vulcanization at this point of time, the mold is opened to take out the vulcanized, which is then carried to the carrying-out line to the following cooling process.

The vulcanizing station C comprises a plurality of mold bases 2 radially arranged, and the mold base 2 has guide rails 3 for guiding the tire mold assembly 1 toward the transfer station D, an internal pressure supplying device (not shown) for supplying a heating and pressurizing medium to the tire inner part in the tire mold assembly 1, and an external pressure supplying device (not shown) for supplying a heating medium to the tire mold circumferential part. Free rollers for sliding the tire mold assembly 1 are provided on the upper surfaces of the guide rails 3. The number of mold bases 2 in the vulcanizing station C is 6 in FIG. 1, but any number of bases, if radially arranged, may be adapted in the present invention without being limited by this.

The heating and pressurizing medium sealed temporarily into the tire at the time of clamp shaping in the opening and closing station A is replaced by the heating and pressurizing medium from the internal pressure supplying device connected to the tire mold assembly in a prescribed position on the mold base 2 of the vulcanizing station C. Since the tire mold assembly 1 is quickly moved from the opening and closing station A to the vulcanizing station C by the quick rotation of the transfer station D in the present invention, the temporarily sealed heating and pressing medium can be replaced in an extremely short time. Thus, this is preferable from the viewpoint of management of tire quality.

The transfer station D has a mold transfer arm for pushing and pulling the tire mold assembly 1 and a diving device thereof (not shown) on the upper surface. The guide rails 3 and the free rollers attached thereto are provided on a turn table 5. The turn table 5 consists of a circular plate having a rotating shaft on the lower surface thereof as the center, and the rotating shaft is supported by a bearing. A circular rail corresponding to several sets of rollers for supporting the turn table circumferential part are laid on the floor surface, and several sets of rollers are rotated while guided by the rails to support the turn table circumferential part. As the rotating device of the turn table, a rotating means traditionally used in general such as motor can be adapted, and it is connected to the rotating shaft.

The opening and closing station A comprises an opening and closing device 6 for opening and closing the tire mold assembly 1, a loader 7, and an unloader 8 in addition to the same mold base 2 as in the vulcanizing station C.

The opening and closing device 6 has the metal mold base 2, an upper movable plate 9 for suspending the upper die part of the tire mold assembly 1 above the mold base 2 to vertically move it, a frame 10 for supporting and guiding the upper movable plate 9 in such a manner as to be vertically movable, and a lower central mechanism (not shown). The lower central mechanism is situated in the center of the mold base 2 to operate a bladder to the center of the lower die part of the tire mold assembly 1 placed on the mold base 2 from the lower side. The frame 10 is stood on the sides of the metal mold base 2, the upper movable plate 9 has a split die type operating cylinder and a mold connecting device in the center, respectively, and the frame 10 has a lifting cylinder (not shown) for raising and lowering the upper movable plate 9.

A series of operations in the opening and closing station A is illustrated below.

(1) The tire mold assembly 1 close to the vulcanization end is transferred from the vulcanizing station C to the transfer station D by a pulling device, rotated, transferred to the opening and closing station A similarly by a pushing device, and delivered into the opening and closing device 6.

(2) When the tire mold assembly 1 is stopped, the upper movable plate 9 is lowered to connect the mold connecting device and split die type operating device of the upper movable plate 9 to the upper die part of the tire mold assembly 1, and after the vulcanization is ended, the upper die part is opened according to the rise of the upper movable plate 9.

(3) The vulcanized tire left on the lower die part is peeled from the lower die part by the lower central mechanism.

(4) The unloader 8 is moved onto the lower die part to hold the bead part of the vulcanized tire by claws, carrying it to the carrying-out line.

(5) On the other hand, an unvulcanized tire is carried from the carrying-in line, held by the loader 7, and placed on the lower die part of the tire mold assembly laid in open state.

(6) The lower central mechanism is operated to insert the bladder into the unvulcanized tire. Shaping is performed during the mold clamping step, and after the upper and lower die parts are closed, the tire mold assembly is pressurized to introduce the heating and pressuring medium into the tire followed by sealing.

(7) When the upper and lower die parts are closed, the lower central mechanism and the upper movable plate are retreated downward and upward, respectively, in the state where the bladder is left in the mold.

(8) The resulting tire mold assembly 1 is carried to an empty vulcanizing station C through the transfer station D.

The auxiliary station B comprises the same opening and closing device 6 as in the opening and closing station A attached to the same mold base 2 as in the vulcanizing station C, and can perform the opening and closing of the mold 2 in addition to vulcanization. Only the opening and closing device 6 may be provided so as not to perform the vulcanization. The auxiliary station B can be used as the mold replacing station as well as the use as the evacuation place when a trouble occurs in the opening and closing station A In this case, a mold replacement/maintenance base 11 is provided on the side of the auxiliary station B.

In the trouble of the opening and closing station A, (1) the tire mold assembly 1 close to vulcanization end is transferred from the transfer station D to the auxiliary station B.

(2) The upper die part of the tire mold assembly 1 is opened in the auxiliary station B to take out the vulcanized tire. Thereafter, the upper die part of the tire mold assembly 1 is closed, the tire mold assembly 1 is transferred to the vulcanizing station C through the transfer station D and heated so that the mold assembly 1 is not cooled, and the temperature is maintained and controlled.

(3) The above processes (1), (2) are repeated until the opening and closing station A is restored, and returned to the general operation when the opening and closing station is restarted.

By providing the auxiliary station B, thus, the vulcanized tire can be taken out in the auxiliary station B without over-curing in the vulcanizing station C even if a trouble occurs in the opening and closing station A. Thus, no defective product by over-curing is provided.

In the mold replacement, the delivery of the tire mold assembly 1 having a mold replaced can be performed between the auxiliary station B and the vulcanizing station C during the general tire manufacturing process of delivering the tire mold assembly 1 between the opening and closing station A and the vulcanizing station C. Therefore, time can be effectively utilized without requiring the interruption of vulcanization, and no effect is exerted on the production plan. In the mold replacement, the corresponding bladder may be, of course, replaced according to the mold (tire mold assembly).

The other embodiment of the present invention is shown in FIG. 2.

The tire vulcanizing equipment of FIG. 2 comprises a line of two tire vulcanizing equipments 21, 22 of FIG. 1, in which the tire mold assembly 1 can be moved between both the equipments by laying guide rails 23. Thus, even if the auxiliary stations B1, B2 are not provided, respectively, the tire mold assembly 1 can be carried to either one of the opening and closing stations A1, A2 to avoid a trouble.

According to the present invention, the circular arrangement around the transfer station of the vulcanizing stations for vulcanizing tire mold assemblies thereon allows the shortening of carrying distance and the shortening of carrying time, so that the tire mold assembly can be carried into and out from any vulcanizing station substantially in the same time.

The opening and closing device is fixed onto the same circumference as the vulcanizing stations so that the central transfer station performs only the transfer. Therefore, the opening and closing device and the transfer device can be simplified, and the shortening of carrying time can be also attained by the increase in turning speed of the transfer device. Further, the physical distribution device can be simplified and made intensive since the carrying-out line of vulcanized tires and the carrying-in line of unvulcanized tires can be collected to one place (the opening and closing station).

Further, according to the present invention, the auxiliary station (opening and closing device) is provided on the same circumference as the vulcanizing stations in addition to the opening and closing station, so that the taking-out of vulcanized tire can be performed in the auxiliary station without stopping the flow of the whole equipment even when the opening and closing device of the opening and closing station is stopped by any trouble, and the products can be prevented from being defective by over-curing.

This auxiliary station can be used as a mold replacing station by connecting a mold replacing line thereto. The transfer process of the tire mold assembly between the opening and closing station and the vulcanizing station is continued, during the mold replacement, and the tire manufacturing process is never interrupted.

While the invention has been described in detail and with reference to specific embodiments thereof, it will be apparent to one skilled in the art that various changes and modifications can be made therein without departing from the spirit and the scope thereof.

The entire disclosure of Japanese Patent Application No. 10-49219 filed on Mar. 2, 1998 including specification, claims, drawings and summary are incorporated herein by reference in its entirety.

What is claimed is:

1. A tire vulcanizing equipment comprising:
vulcanizing stations comprising an arrangement of a plurality of mold bases capable of placing tire mold assemblies movable in closed state and having pipings for supplying and discharging a vulcanization medium to the tire mold assemblies placed thereon;

an opening and closing station having an opening and closing device for opening and closing a tire mold assembly, and connected to a carrying-out line of vulcanized tires to a following process and a carrying-in line of unvulcanized tires; and a transfer station having a transfer device for transferring the tire mold assembly to the vulcanizing stations and the opening and closing station, the vulcanizing stations and the opening and closing station being arranged circularly around the transfer station.

2. A tire vulcanizing equipment according to claim 1 wherein an auxiliary station is further provided on the circle, and an opening and closing device for opening and closing the tire mold assembly is arranged in the auxiliary station.

3. A tire vulcanizing equipment according to claim 1 wherein two or more circles consisting of the vulcanizing stations and the opening and closing station arranged circularly around the transfer station are juxtaposed.

4. A tire vulcanizing equipment according to claim 1 wherein the transfer station is formed of a rotary turn table and a mechanism for delivering the tire mold assembly onto the turn table.

5. A tire vulcanizing equipment according to claim 3 wherein the transfer station is formed of a rotary turn table and a mechanism for delivering the tire mold assembly onto the turn table.

* * * * *